(12) United States Patent
Tom et al.

(10) Patent No.: US 6,735,978 B1
(45) Date of Patent: May 18, 2004

(54) TREATMENT OF SUPERCRITICAL FLUID UTILIZED IN SEMICONDUCTOR MANUFACTURING APPLICATIONS

(75) Inventors: Glenn M. Tom, New Milford, CT (US); Michael B. Korzenski, Danbury, CT (US); Eliodor G. Ghenciu, King of Prussia, PA (US); Chongying Xu, New Milford, CT (US); Thomas H. Baum, New Fairfield, CT (US)

(73) Assignee: Advanced Technology Materials, Inc., Danury, CT (US)

( * ) Notice: Subject to any disclaimer, the term of this patent is extended or adjusted under 35 U.S.C. 154(b) by 0 days.

(21) Appl. No.: 10/364,558

(22) Filed: Feb. 11, 2003

(51) Int. Cl.[7] .............................. F25D 1/00; F25D 3/00; B01D 50/00; C01B 17/16
(52) U.S. Cl. ........................... 62/606; 62/617; 423/220; 423/437.1; 422/171
(58) Field of Search .................. 62/606, 617; 423/220, 423/437.1; 422/171

(56) References Cited

U.S. PATENT DOCUMENTS

| | | | | |
|---|---|---|---|---|
| 4,079,117 A | * | 3/1978 | Butwell | ...................... 423/228 |
| 4,770,862 A | * | 9/1988 | Chu et al. | ..................... 423/229 |
| 4,824,570 A | * | 4/1989 | Bethuel et al. | .............. 210/511 |
| 5,061,465 A | * | 10/1991 | Carter | .......................... 423/229 |
| 5,232,604 A | * | 8/1993 | Swallow et al. | ............. 210/759 |
| 6,592,829 B2 | * | 7/2003 | Chakravarti et al. | ......... 422/171 |
| 2003/0161780 A1 | * | 8/2003 | Howard et al. | ........... 423/437.1 |

\* cited by examiner

*Primary Examiner*—William C. Doerrler
(74) *Attorney, Agent, or Firm*—Margaret Chappuis; Steven J. Hultquist

(57) ABSTRACT

A system and process for utilization and disposition of a supercritical fluid composition, in which a supercritical fluid (SCF) composition is used in an SCF-using process facility such as a semiconductor manufacturing plant. The supercritical fluid composition is withdrawn from the process facility containing at least one component that is extraneous with respect to the further disposition of the supercritical fluid composition. The withdrawn supercritical fluid composition is converted to a pressurized liquid, which is treated to at least partially remove the extraneous component(s) therefrom. The extraneous component(s)-depleted pressurized liquid in its further disposition can be reconverted to a supercritical state for recycle to the SCF-using process facility, or it can be gasified and discharged to the atmosphere in the case of supercritical fluids such as $CO_2$.

94 Claims, 2 Drawing Sheets

TREATMENT OF SUPERCRITICAL FLUID UTILIZED IN SEMICONDUCTOR MANUFACTURING APPLICATIONS

FIELD OF THE INVENTION

The present invention relates to the treatment of supercritical fluids utilized in semiconductor manufacturing, e.g., supercritical fluids such as supercritical carbon dioxide (SCCO2) that are used in supercritical fluid compositions for the stripping of photoresists and etching residues, for deposition of thin film materials, etc.

DESCRIPTION OF THE RELATED ART

Semiconductor manufacturing involves the use of photoresists that are applied to wafer substrates and subsequently developed to produce specific patterned regions and structures on the wafer. The exposed photoresist is subsequently etched and optionally ashed to remove undesired material from the substrate. Other semiconductor manufacturing operations involve etching of deposited films to form the desired microelectronic device architecture. Applied films of the semiconductor device structure may be planarized by chemical mechanical polishing (CMP) operations, using a solvent-based slurry composition including fine particles of an abrasive medium, such as finely divided forms of metals or ceramics.

These material removal operations typically leave residues on the substrate that must be removed in order to render the product device structure suitable for its intended purpose. For this purpose, a variety of cleaning agents have been proposed and used in the art. Supercritical fluids have been proposed for such application, as solvating and/or entrainment media to effect or assist removal of the unwanted material from the substrate.

Additionally, supercritical fluids are of interest for the deposition of epitaxial thin films and materials in the manufacture of semiconductor products, as carrier media for chemical vapor deposition, ion implantation, and other deposition operations.

A supercritical fluid has the characteristics of both a liquid and a gas. Like a gas, it diffuses rapidly, has low viscosity, near-zero surface tension, and penetrates easily into deep features on the semiconductor substrate. Like a liquid, it has bulk flow and solvating capabilities and therefore is useful as a wash or carrier medium.

In the foregoing semiconductor manufacturing operations in which supercritical fluids are used as process solvents, the supercritical fluid can be formulated with other components to improve its utility for the intended use and/or the supercritical fluid as used in the semiconductor manufacturing can become contaminated with extraneous material such as the post-ash, post-etch residue when the supercritical fluid is used for resist removal. Thus, although it would be desirable to recycle the supercritical fluid for reuse in the semiconductor manufacturing facility, or to release the supercritical fluid (e.g., carbon dioxide) to the atmosphere after its use, the presence of extraneous material in the supercritical fluid composition precludes such disposition.

The art therefore is in need of approaches that would enable the supercritical fluid compositions containing extraneous material to be processed for removal of the extraneous material so that the supercritical fluid can be reused in the process in which it is initially employed and/or discharged from the process free of such extraneous material.

SUMMARY OF THE INVENTION

The present invention relates to the treatment of supercritical fluids utilized in semiconductor manufacturing, e.g., supercritical fluids such as supercritical carbon dioxide (SCCO2) that are used in supercritical fluid compositions for the stripping of photoresists and etching residues, for deposition of thin film materials, etc., to remove extraneous components from such supercritical fluid compositions so that they can be recirculated for reuse and/or discharged as a treated effluent from the manufacturing facility.

In one aspect, the invention relates to a process for utilization and disposition of a supercritical fluid composition, comprising (a) utilizing a supercritical fluid (SCF) composition in an SCF-using process system;

(b) removing the supercritical fluid composition from the SCF-using process system, wherein the supercritical fluid composition contains at least one extraneous component in respect of further disposition of said supercritical fluid composition;

(c) converting the supercritical fluid composition to a pressurized liquid; and (d) treating the pressurized liquid to at least partially remove said at least one extraneous component therefrom, thereby preparing it for said further disposition.

In another aspect, the invention relates to a system for utilization and disposition of a supercritical fluid composition, comprising (a) a supercritical fluid (SCF) composition source;

(b) a SCF-using process facility coupled in supercritical fluid composition-receiving relationship with said supercritical fluid composition source, whereby said supercritical fluid composition is provided for use in said SCF-using process facility, and wherein the SCF-using process facility is arranged to discharge therefrom the supercritical fluid composition after said use, wherein the supercritical fluid composition contains at least one extraneous component in respect of further disposition of said supercritical fluid composition;

(c) a converter arranged to convert the supercritical fluid composition discharged from the process facility to a pressurized liquid; and (d) a treatment facility arranged to treat the pressurized liquid to at least partially remove said at least one extraneous component therefrom, thereby preparing it for said further disposition.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
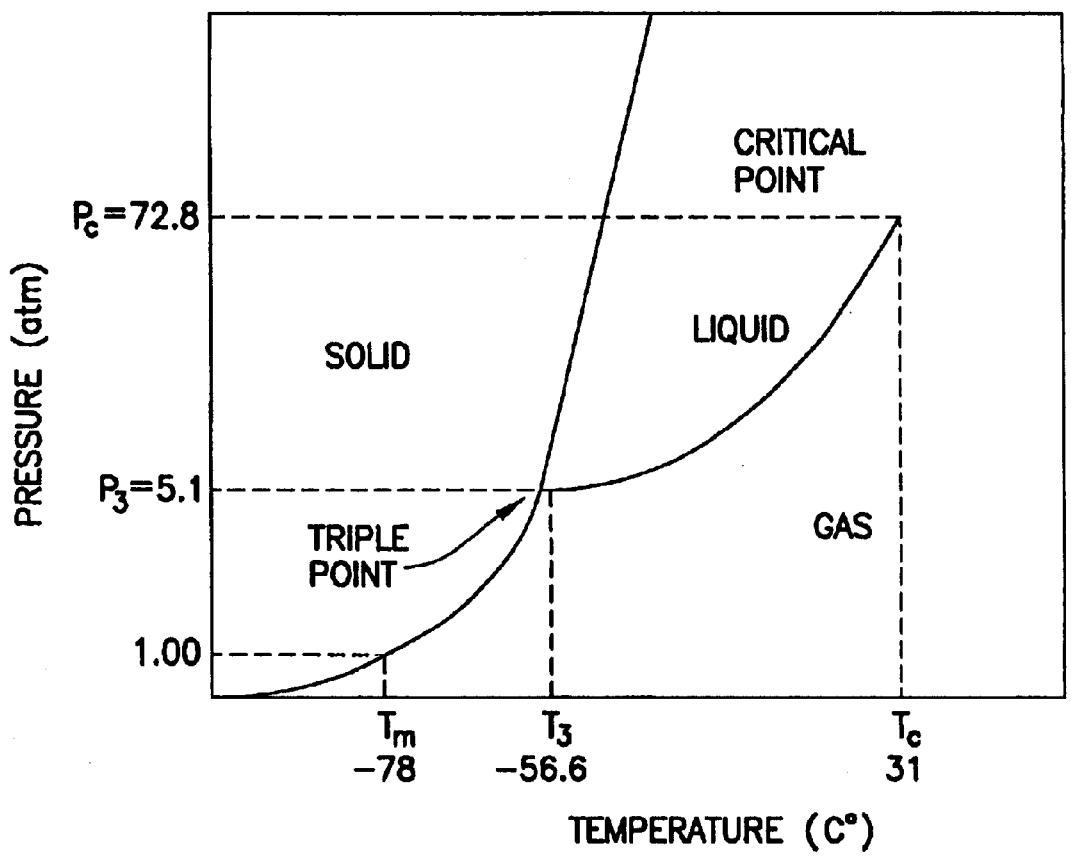
FIG. 1 shows a phase diagram for carbon dioxide ($CO_2$).

The present invention is based on the discovery that a supercritical fluid composition, e.g., supercritical carbon dioxide-based cleaning composition used for the removal of post-etch residue from semiconductor substrates on which same is present, can be advantageously processed to remove extraneous components therefrom subsequent to use in the supercritical fluid-utilizing process, so that the supercritical fluid can be reused or discharged from the process system, without gasification of the supercritical fluid.

Prior approaches to treatment of supercritical fluids for reuse or discharge as a process effluent have involved gasification of the supercritical fluid, so that the supercritical fluid is flashed off to effect separation of the supercritical fluid from extraneous components, which then may be separately processed for final disposition or other use. Such gasification of the supercritical fluid involves release of the high pressure necessary for achievement and maintenance of the supercritical fluid state, so that subsequent reuse of the fluid for supercritical fluid usage in the process system entails recompression and liquefaction in passing into the supercritical state. This is extremely energy inefficient.

The present invention overcomes such deficiency of the prior art, by converting the supercritical fluid from the supercritical state to a non-supercritical, liquid state and treating the composition containing the non-supercritical liquid to remove extraneous components therefrom. The maintenance of a pressurized liquid state thereby permits the non-supercritical liquid to be readily repressurized to the supercritical state without gasification of the fluid, or alternatively to be further treated in a manner utilizing the "pressure value" of the fluid, or otherwise expanded to gasify the fluid for ultimate release. In this manner, the invention avoids the necessity of substantial additional energy requirements of compressing the fluid from an initial gaseous state to a supercritical fluid pressure, and the greatly increased volumetric requirements of associated process equipment for processing gas as opposed to liquid.

Thus, the invention contemplates a process system including a high pressure process facility, e.g., a semiconductor manufacturing facility, in which a supercritical fluid is employed and from which a supercritical fluid composition is produced, in which the supercritical fluid composition includes extraneous components, viz., processing contaminants or by-products of the use of the supercritical fluid in the process facility, which are necessarily or desirably removed from the supercritical fluid composition, before the supercritical fluid can be reused in the process facility or alternatively discharged as effluent of the process facility.

The supercritical fluid composition in accordance with the invention is processed to convert the supercritical fluid in the composition from a supercritical state to a non-supercritical pressurized liquid state, and in such non-supercritical pressurized liquid state, the non-supercritical pressurized liquid is treated to remove the extraneous components therefrom, and then reused in the process facility or discharged as effluent of the process facility.

The process of the invention therefore maintains the fluid of the supercritical medium at high pressure in the treatment operation, to conserve energy so that the fluid medium can be converted to the supercritical regime, or so that the pressure value of the fluid medium can be used in subsequent processing of the fluid for final discharge from the process system.

The extraneous component(s) can be soluble or suspended in the supercritical fluid, and include such materials as stripped resists, metals, oxides, ashing residues, organic and inorganic particulates, solvents, film materials, etc. Such extraneous component(s) can derive from cleaning of a microelectronic device article, such as a patterned wafer or other substrate article that has been subjected to etching, ashing, chemical mechanical polishing, etc., with the cleaning being conducted in a wafer cleaning facility of a semiconductor manufacturing plant.

The extraneous component(s) can alternatively derive from metalorganic chemical vapor deposition (MOCVD) precursors and MOCVD by-products, where the supercritical fluid is used as a carrier medium in a material deposition operation such as CVD. Alternatively, the extraneous component(s) can derive from ion implantation operations, where the supercritical fluid is employed as a carrier gas in ion implant systems.

The supercritical fluid can be a component of a multi-component composition that includes adjuvants, stabilizers, surfactants, penetrating agents, acids, bases, oxidizers, reducing agents, co-solvents, etc., as intrinsic components of the composition that enhance the utility of the supercritical fluid composition for its intended purpose. These intrinsic components of the supercritical fluid composition can also be extraneous components in the treatment of the supercritical fluid composition if such components are to be removed from the SCF material for ultimate discharge of the purified SCF material to the atmosphere or other effluent discharge locus, without reuse of the supercritical fluid material in the process facility. Thus, the extraneous components broadly comprehend any material in the supercritical fluid composition that is desired to be removed prior to further disposition of the supercritical fluid material, and that is superfluous to the supercritical fluid material in such further disposition.

As an illustrative example, such supercritical fluid multicomponent composition can be a post-etch residue cleaning composition for removing residue from the surface of a semiconductor wafer device structure after patterning of the wafer, resist development and ashing. A specific composition for such purpose can for instance include supercritical $CO_2$ (SCCO2), methanol, ammonium fluoride ($NH_4F$), and boric acid ($H_3BO_3$).

The supercritical fluid (SCF) employed in the practice of the present invention can be of any suitable type. Supercritical fluids are formed under conditions at which the density of the liquid phase equals the density of the gaseous phase of the substance. For example, carbon dioxide ($CO_2$), which is a gas at standard temperature and pressure, undergoes a transition from liquid to SCF above a critical point, corresponding to $T_c \geq 31.1°$ C. and $p_c \geq 72.8$ atm. Once formed, the density of the SCF can be varied from liquid-like to gaseous-like, yielding different solvation abilities, by varying the pressure and temperature. Supercritical fluids have a density/solubility and diffusibility approaching that of the liquid and gaseous phase, respectively. Additionally, the surface tension of SCFs is negligible.

Because of its readily manufactured character, lack of toxicity and negligible environmental effects, supercritical $CO_2$ is a preferred SCF in the broad practice of the present invention, although the invention may be practiced with any suitable SCF species, with the choice of a particular SCF depending on the specific application involved. Other preferred SCF species useful in the practice of the invention include oxygen, argon, krypton, xenon, and ammonia.

The invention therefore contemplates a process facility in which a supercritical fluid composition is employed for a processing operation therein, e.g., cleaning of a semiconductor substrate surface after treatment thereof, e.g., by etching, photoresist development, passivation, chemical functionalization, or other treatment operation. The supercritical fluid then is withdrawn from the processing operation and treated in accordance with the present invention to remove the extraneous components of the composition.

In such treatment, the supercritical fluid composition containing the supercritical fluid and extraneous components is subjected to a change of process conditions (e.g., a reduction of pressure and/or temperature) so that the supercritical fluid becomes a non-supercritical liquid at elevated pressure. In the non-supercritical pressurized liquid state, the liquid is amenable to treatment that is infeasible in the supercritical state, whereby the contaminants and other extraneous components are readily removed from the non-supercritical pressurized liquid.

The change of process conditions to which the supercritical fluid composition is subjected is determinable based on a consideration of the phase diagram of the supercritical fluid species involved, and the unit operation(s) that are to be employed or that are potentially useful for the removal of the extraneous components from the non-supercritical pressurized liquid. For example, the gas/liquid boundary line on the pressure-temperature (P/T) phase diagram of the supercritical fluid species selected for process usage will intersect the liquid/solid boundary line at the triple point, and between these convergent lines will be a liquid phase region that is adjacent a supercritical region. The supercritical region will be demarcated by the critical point for the fluid species involved, with temperatures above the critical point temperature and pressures above the critical point pressure defining a P/T region of supercritical fluid behavior. For SCCO2, as shown in FIG. 1, the supercritical region includes a P/T region having a pressure above about 75 bar (75 atmospheres) and a temperature above about 30° C. The temperature of SCCO2 can therefore be lowered to 10° C. at a pressure of 150 bar, to produce pressurized liquid $CO_2$ that is amenable to extraneous component removal operation(s), such as: scrubbing in a scrubber using wet scrubbing and/or dry scrubbing techniques; liquid/liquid extraction in an extractor column or other extraction apparatus; in situ chemical reaction removal (e.g., complexing or precipitate formation) in a reaction vessel adapted for such purpose; affinity medium contacting using an affinity medium, e.g., a chromatographic resin in a contacting vessel such as a metal or glass column containing such resin, wherein the affinity medium has an affinity for the contaminant species; actinic radiation exposure (e.g., to polymerize contaminants susceptible to free-radical polymerization) using a uv lamp or other radiation source to irradiate the pressurized liquid; desolubilization of contaminants soluble in the fluid when in the supercritical state but insoluble in the non-supercritical pressurized liquid, such as in a separation chamber or other apparatus dedicated to such treatment; or any other suitable method for removing the contaminant(s) and/or other extraneous component(s) from the pressurized liquid to yield an extraneous component(s)-reduced non-supercritical pressurized liquid. Preferably the treated pressurized liquid is free, or at least substantially free, of such extraneous component(s), at the conclusion of treatment of the pressurized liquid.

The extraneous component(s)-reduced non-supercritical pressurized liquid then can be heated to raise its temperature so that it is converted back into a supercritical fluid state, for reuse in the process facility, or the contaminant-reduced non-supercritical pressurized liquid can then be gasified or further processed to render it suitable for final effluent discharge. For example, when SCCO2 is the supercritical fluid species, the contaminant-reduced pressurized liquid $CO_2$ can be gasified and discharged to the atmosphere, optionally with recovery of the energy of compression of the liquid, e.g., by passage of the liquid through an expansion nozzle, and flow of the resulting gas through a turbine generator providing power for the process facility.

The features and advantages of the invention will be more fully apparent from the following illustrative embodiment of the invention.

Figure 2:
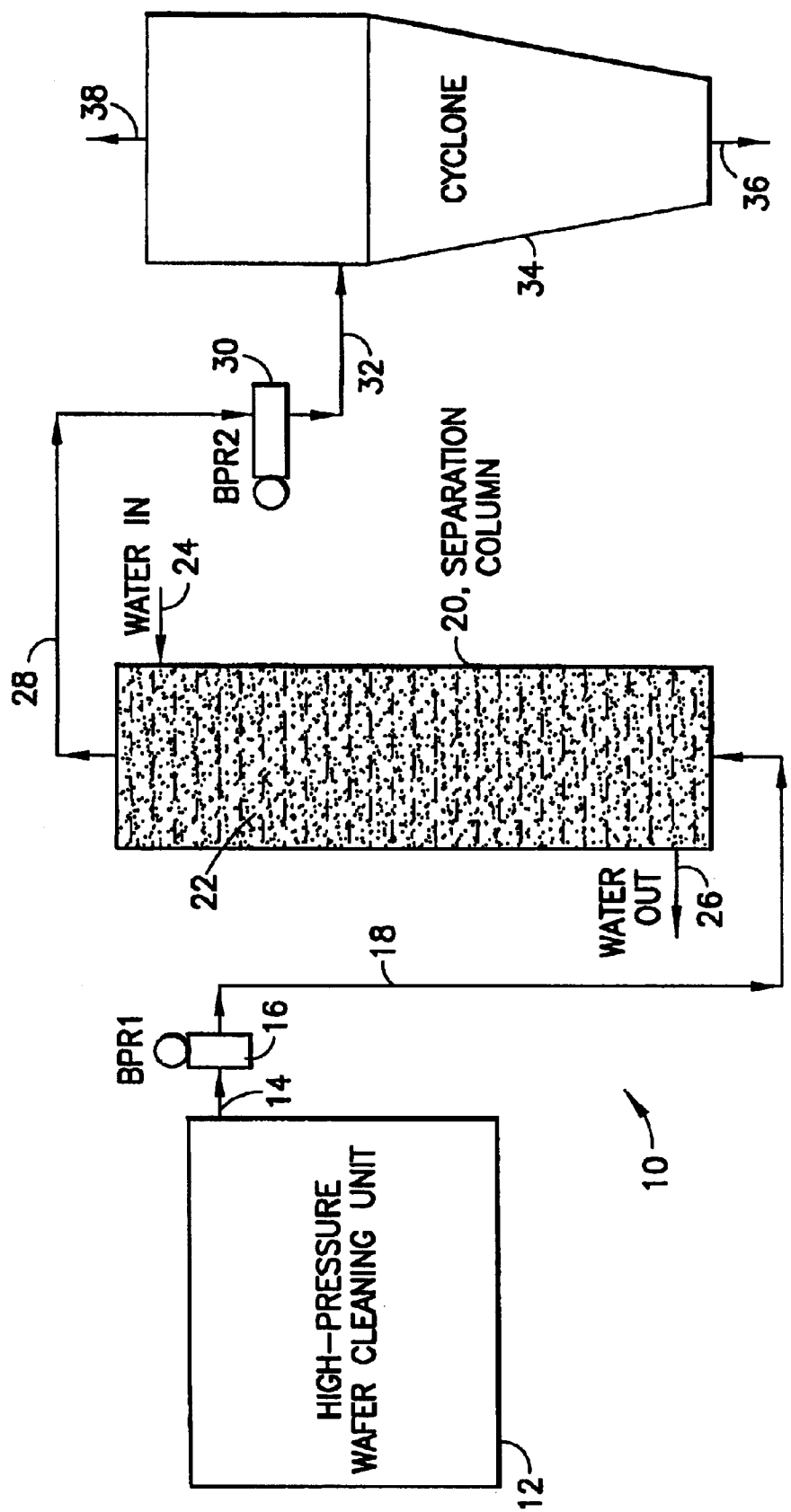
FIG. 2 is a schematic representation of a process system according to one embodiment of the invention.

FIG. 2 is a schematic representation of a process system 10 utilizing SCCO2 as a supercritical fluid in a supercritical fluid composition including the $CO_2$ SCF component, a co-solvent (e.g., an alcohol), and surfactant, oxidant and/or reducing agent(s) as necessary or desirable to increase the solubility of solutes in the SCCO2 component. The supercritical fluid composition in this illustrative embodiment is employed in a semiconductor manufacturing facility for post-ash or post-etch cleaning of wafers.

The process system 10 in FIG. 2 includes a high-pressure wafer cleaning unit 12 as an SCF composition-using facility, in which the supercritical fluid is contacted with microelectronic device structures to remove processing residues such as post-ashing residue and/or post-etch residue from the surface of the wafer substrate.

The wafer cleaning unit 12 discharges the contacted supercritical fluid composition in line 14. The contacted supercritical fluid composition contains the solubilized and suspended residue as a contaminant, which must be removed from the supercritical fluid composition before it can be finally disposed of. The contaminated supercritical fluid composition in line 14 is flowed through backpressure regulator 16 (BPR1) and is depressurized by the regulator to a pressure at which the supercritical fluid at its working temperature will be in the liquid phase, as a pressurized, liquid phase composition.

The pressurized, liquid phase composition then flowed in line 18 into the separation column 20. The separation column 20 can be constructed in any suitable manner to effect contacting of the introduced pressurized, liquid phase composition with the liquid stripping medium, introduced to the top of the separation column in feed line 24. The stripping medium can be of any suitable type, and in one embodiment of the invention comprises water or other aqueous medium, in which the contaminants and the non-SCF components of the supercritical fluid composition have higher solubility than in the SCF liquid.

Thus, the non-SCF components and the contaminants will pass from solubilization in the SCF $CO_2$ into the stripping medium, partitioning into the stripping medium and concentrating in the bottoms stripping medium effluent that is discharged from the separation column 20 in discharge line 26. The stripping medium in this arrangement from the top of the column to the bottom, countercurrent to the flow of the supercritical fluid composition, which flows from the bottom of the column to the top. The stripping medium advantageously is continuously pumped into the column 20 in line 24, while the stripping composition including the stripping medium and the extracted contaminants and non-SCF components of the pressurized liquid composition is continuously pumped out of the column in line 26.

The $CO_2$ overhead, reduced and preferably depleted in extraneous components content, is discharged from the column 20 in line 28, and can at such point be recirculated back to the wafer cleaning unit 12 for reuse in the wafer cleaning operation, if desired. It may be desired in such instance to arrange the separation column and choice of stripping medium so that only contaminants are removed from the pressurized liquid in the column, and the other additives in the supercritical fluid composition are retained therein for the purpose of recycling the composition for reuse in the wafer cleaning unit 12.

If, however, it is desired to ultimately discharge the supercritical fluid, e.g., $CO_2$ in this embodiment, to the atmosphere or other locus, free of any extraneous components, including additives in the supercritical fluid composition, then the system as shown in FIG. 2 can be employed to produce such final SCF effluent.

For such atmospheric pressure discharge, the $CO_2$ overhead from the column 20 in line 28 is flowed to the backpressure regulator 30 (BPR2), whereby the $CO_2$ overhead is depressurized to atmospheric pressure in the cyclone vessel 34. The cyclone vessel 34 is sized according to the volumetric flow rate of gas that will pass therethrough in the operation of the system.

The cyclone vessel can, if desired, be filled with activated carbon or other chemical sorbent or treatment medium, which in contact with the $CO_2$ overhead gas will serve to "polish" the $CO_2$ effluent by removing any trace or residual extraneous components that may have escaped removal in the stripping column 20. In such arrangement, the added treatment reagents may be discharged from the cyclone vessel 34 in underflow line 36, while the finally treated $CO_2$ or other supercritical fluid species is discharged from the cyclone vessel 34 in effluent discharge line 38.

The backpressure regulators in the FIG. 2 system can be heated to avoid any particle generation due to temperature fluctuations.

While the FIG. 2 system has been shown with treatment of the pressurized liquid composition in a single stripping column for removal of all extraneous components of the composition, it may be desirable in specific applications to employed a series of discrete treatment units, for successive removal of respective extraneous components of the composition, e.g., multiple columns, each of which effects removal of different extraneous components, or differing fractions of the extraneous components.

The invention therefore contemplates treatment of a supercritical fluid composition after conversion thereof to a pressurized liquid composition by modulation of pressure and/or temperature thereof, so that unit operations for purification of the composition to remove extraneous components therefrom can be carried out in a ready and efficient manner not possible if the composition were to be maintained in a supercritical state for such treatment operations.

The pressurized liquid treatment operations can, as discussed hereinabove, be of any suitable type, as efficacious for removal of the extraneous components of the composition, so that it is purified to a predetermined extent for subsequent reuse in the process facility, or for final effluent discharge from the treatment system.

While the invention has been described herein in reference to specific aspects, features and illustrative embodiments of the invention, it will be appreciated that the utility of the invention is not thus limited, but rather extends to and encompasses numerous other aspects, features and embodiments. The claims hereafter set forth therefore are intended to be correspondingly broadly construed, as including all such aspects, features and embodiments, within their spirit and scope.

What is claimed is:

1. A process for utilization and extraneous component removal treatment of a supercritical fluid composition without gasification, wherein said process is conducted while maintaining said supercritical fluid composition in a supercritical or a pressurized liquid state, comprising
   (a) utilizing the supercritical fluid (SCF) composition in an SCF-using process system;
   (b) removing the supercritical fluid composition from the SCF-using process system, wherein the supercritical fluid composition contains at least one extraneous component in respect of further disposition of said supercritical fluid composition;
   (c) converting the supercritical fluid composition to a pressurized liquid; and
   (d) treating the pressurized liquid to at least partially remove said at least one extraneous component therefrom, thereby preparing it for said further disposition.

2. The process of claim 1, wherein the supercritical fluid composition comprises a supercritical fluid component selected from the group consisting of $CO_2$, oxygen, argon, krypton, xenon, and ammonia.

3. The process of claim 1, wherein the supercritical fluid composition comprises supercritical $CO_2$.

4. The process of claim 1, wherein said step (a) of utilizing a supercritical fluid (SCF) composition in an SCF-using process system comprises using said supercritical fluid in a semiconductor manufacturing facility.

5. The process of claim 4, wherein said step of using said supercritical fluid in a semiconductor manufacturing facility comprises cleaning of a microelectronic device article.

6. The process of claim 5, wherein said microelectronic device article comprises a semiconductor wafer.

7. The process of claim 6, wherein said cleaning comprises removal of a residue deriving from a processing step selected from the group consisting of etching, ashing and chemical mechanical polishing.

8. The process of claim 7, wherein said supercritical fluid composition comprises supercritical $CO_2$.

9. The process of claim 8, wherein said supercritical fluid composition further comprises at least one component selected from the group consisting of adjuvants, stabilizers, surfactants, penetrating agents, acids, bases, oxidizers, reducing agents and co-solvents.

10. The process of claim 8, wherein said supercritical fluid composition further comprises at least one component selected from the group consisting of methanol, ammonium fluoride ($NH_4F$), and boric acid ($H_3BO_3$).

11. The process of claim 8, wherein said supercritical fluid composition further comprises methanol, ammonium fluoride ($NH_4F$), and boric acid ($H_3BO_3$).

12. The process of claim 4, wherein said step of using said supercritical fluid in a semiconductor manufacturing facility comprises utilizing the supercritical fluid as a carrier medium in a material deposition operation.

13. The process of claim 12, wherein said material deposition operation comprises chemical vapor deposition.

14. The process of claim 4, wherein said step of using said supercritical fluid in a semiconductor manufacturing facility comprises utilizing the supercritical fluid as a carrier medium in an ion implantation operation.

15. The process of claim 1, wherein said at least one extraneous component comprises at least one component selected from the group consisting of resists, metals, oxides, ashing residues, organic and inorganic particulates, solvents, and film materials.

16. The process of claim 1, wherein said at least one extraneous component comprises at least one component selected from the group consisting of adjuvants, stabilizers, surfactants, penetrating agents, acids, bases, oxidizers, reducing agents and co-solvents.

17. The process of claim 16, wherein said at least one extraneous component comprises at least one component selected from the group consisting of methanol, ammonium fluoride ($NH_4F$), and boric acid ($H_3BO_3$).

18. The process of claim 1, wherein said at least one extraneous component comprises at least one component of the supercritical fluid composition as originally formulated.

19. The process of claim 1, wherein said at least one extraneous component comprises contaminant incorporating into the supercritical fluid composition in said utilizing step (a).

20. The process of claim 1, wherein said step (c) of converting the supercritical fluid composition to a pressurized liquid, comprises changing pressure of the supercritical fluid composition.

21. The process of claim 20, wherein said step (c) of converting the supercritical fluid composition to a pressurized liquid, comprises reducing the pressure of the supercritical fluid composition.

22. The process of claim 1, wherein said step (c) of converting the supercritical fluid composition to a pressurized liquid, comprises changing temperature of the supercritical fluid composition.

23. The process of claim 22, wherein said step (c) of converting the supercritical fluid composition to a pressurized liquid, comprises reducing temperature of the supercritical fluid composition.

24. The process of claim 1, wherein said step (c) of converting the supercritical fluid composition to a pressurized liquid, comprises changing at least one of temperature and pressure of the supercritical fluid composition.

25. The process of claim 1, wherein said step (c) of converting the supercritical fluid composition to a pressurized liquid, comprises reducing at least one of temperature and pressure of the supercritical fluid composition.

26. The process of claim 1, wherein step (d) of treating the pressurized liquid to at least partially remove said at least one extraneous component therefrom, thereby preparing it for said further disposition, comprises at least one treatment selected from the group consisting of: scrubbing; liquid/liquid extraction; in situ chemical reaction removal; affinity medium contacting using an affinity medium having an affinity for said at least one extraneous component; actinic radiation exposure; desolubilization of said at least one extraneous component soluble in the SCF when in the supercritical state but insoluble in the non-supercritical pressurized liquid.

27. The process of claim 1, wherein step (d) of treating the pressurized liquid to at least partially remove said at least one extraneous component therefrom, thereby preparing it for said further disposition, comprises scrubbing of the pressurized liquid.

28. The process of claim 1, wherein step (d) of treating the pressurized liquid to at least partially remove said at least one extraneous component therefrom, thereby preparing it for said further disposition, comprises liquid/liquid extraction.

29. The process of claim 1, wherein step (d) of treating the pressurized liquid to at least partially remove said at least one extraneous component therefrom, thereby preparing it for said further disposition, comprises in situ chemical reaction removal.

30. The process of claim 1, wherein step (d) of treating the pressurized liquid to at least partially remove said at least one extraneous component therefrom, thereby preparing it for said further disposition, comprises affinity medium contacting using an affinity medium having an affinity for said at least one extraneous component.

31. The process of claim 1, wherein step (d) of treating the pressurized liquid to at least partially remove said at least one extraneous component therefrom, thereby preparing it for said further disposition, comprises actinic radiation exposure of the pressurized liquid.

32. The process of claim 1, wherein step (d) of treating the pressurized liquid to at least partially remove said at least one extraneous component therefrom, thereby preparing it for said further disposition, comprises desolubilization of said at least one extraneous component, which is soluble in the SCF when in the supercritical state but insoluble in the non-supercritical pressurized liquid.

33. The process of claim 1, further comprising converting the treated pressurized liquid from step (d) to a supercritical state, to thereby regenerate said supercritical fluid composition.

34. The process of claim 33, wherein the step of converting the treated pressurized liquid from step (d) to a supercritical state, comprises changing at least one of temperature and pressure of the pressurized liquid.

35. The process of claim 33, wherein the step of converting the treated pressurized liquid from step (d) to a supercritical state, comprises heating the pressurized liquid.

36. The process of claim 33, wherein the step of converting the treated pressurized liquid from step (d) to a supercritical state, comprises changing pressure of the pressurized liquid.

37. The process of claim 33, wherein regenerated supercritical fluid composition is recycled to said SCF-using process system.

38. The process of claim 1, wherein step (d) of treating the pressurized liquid to at least partially remove said at least one extraneous component therefrom, thereby preparing it for said further disposition, comprises at least partially removing contaminants deriving from utilizing said supercritical fluid (SCF) composition in said SCF-using process system.

39. The process of claim 38, further comprising converting the treated pressurized liquid from step (d) to a supercritical state, to thereby regenerate said supercritical fluid composition.

40. The process of claim 39, wherein regenerated supercritical fluid composition is recycled to said SCF-using process system.

41. The process of claim 1, wherein said further disposition comprises gasification of the pressurized liquid to yield a gas comprising a supercritical fluid component of said supercritical fluid composition, in gaseous form.

42. The process of claim 41, wherein the gasification comprises depressurization in a cyclone.

43. The process of claim 42, wherein the cyclone contains a contacting medium effective for removal of residual extraneous component(s) from said gas.

44. The process of claim 1, wherein step (d) comprises water stripping of extraneous component from the pressurized liquid.

45. The process of claim 44, wherein said water stripping is conducted in a separation column packed with contacting medium.

46. The process of claim 45, wherein said contacting medium comprises a medium selected from the group consisting of metal mesh elements and glass beads.

47. The process of claim 1, wherein said further disposition comprises discharge to the atmosphere of a supercritical fluid component of the supercritical fluid composition, wherein said supercritical fluid component is in a gasified form.

48. The process of claim 47, wherein the supercritical fluid component comprises $CO_2$.

49. A system for utilization and treatment of a supercritical fluid composition without gasification, wherein said utilization and treatment is conducted while maintaining said supercritical fluid composition in a supercritical or a pressurized liquid state, comprising (a) a supercritical fluid (SCF) composition source;

(b) a SCF-using process facility coupled in supercritical fluid composition-receiving relationship with said supercritical fluid composition source, whereby said supercritical fluid composition is provided for use in said SCF-using process facility, and wherein the SCF-using process facility is arranged to discharge therefrom the supercritical fluid composition after said use, wherein the supercritical fluid composition contains at least one extraneous component in respect of further disposition of said supercritical fluid composition;

(c) a converter arranged to convert the supercritical fluid composition discharged from the process facility to a pressurized liquid; and (d) a treatment facility arranged to treat the pressurized liquid to at least partially remove said at least one extraneous component therefrom, thereby preparing it for said further disposition.

50. The system of claim 49, wherein the supercritical fluid composition source comprises a supercritical fluid component selected from the group consisting of $CO_2$, oxygen, argon, krypton, xenon, and ammonia.

51. The system of claim 49, wherein the supercritical fluid composition source comprises supercritical $CO_2$.

52. The system of claim 49, wherein said SCF-using process facility comprises a semiconductor manufacturing facility.

53. The system of claim 52, wherein said semiconductor manufacturing facility comprises a wafer cleaning unit.

54. The system of claim 53, wherein said wafer cleaning unit is arranged to remove residue from a wafer article, wherein said residue derives from a processing step selected from the group consisting of etching, ashing and chemical mechanical polishing, conducted in said semiconductor manufacturing facility.

55. The system of claim 54, wherein said supercritical fluid composition comprises supercritical $CO_2$.

56. The system of claim 55, wherein said supercritical fluid composition further comprises at least one component selected from the group consisting of adjuvants, stabilizers, surfactants, penetrating agents, acids, bases, oxidizers, reducing agents and co-solvents.

57. The system of claim 55, wherein said supercritical fluid composition further comprises at least one component selected from the group consisting of methanol, ammonium fluoride ($NH_4F$), and boric acid ($H_3BO_3$).

58. The system of claim 55, wherein said supercritical fluid composition further comprises methanol, ammonium fluoride ($NH_4F$), and boric acid ($H_3BO_3$).

59. The system of claim 52, wherein said semiconductor manufacturing facility is arranged to utilize the supercritical fluid as a carrier medium in a material deposition operation.

60. The system of claim 59, wherein said material deposition operation comprises chemical vapor deposition, and said semiconductor manufacturing facility comprises a CVD deposition chamber.

61. The system of claim 52, wherein said semiconductor manufacturing facility is arranged to utilize the supercritical fluid as a carrier medium in an ion implantation operation.

62. The system of claim 49, wherein said at least one extraneous component comprises at least one component selected from the group consisting of resists, metals, oxides, ashing residues, organic and inorganic particulates, solvents, and film materials.

63. The system of claim 49, wherein said at least one extraneous component comprises at least one component selected from the group consisting of adjuvants, stabilizers, surfactants, penetrating agents, acids, bases, oxidizers, reducing agents and co-solvents.

64. The system of claim 49, wherein said at least one extraneous component comprises at least one component selected from the group consisting of methanol, ammonium fluoride ($NH_4F$), and boric acid ($H_3BO_3$).

65. The system of claim 49, wherein said at least one extraneous component comprises at least one component of the supercritical fluid composition as originally formulated.

66. The system of claim 49, wherein said at least one extraneous component comprises contaminant incorporating into the supercritical fluid composition during use of the supercritical fluid composition in said process facility.

67. The system of claim 49, wherein said converter is arranged to change pressure of the supercritical fluid composition.

68. The system of claim 49, wherein said converter is arranged to reduce the pressure of the supercritical fluid composition.

69. The system of claim 49, wherein said converter is arranged to change temperature of the supercritical fluid composition.

70. The system of claim 49, wherein said converter is arranged to reduce temperature of the supercritical fluid composition.

71. The system of claim 49, wherein said converter is arranged to change at least one of temperature and pressure of the supercritical fluid composition.

72. The system of claim 49, wherein said converter is arranged to reduce at least one of temperature and pressure of the supercritical fluid composition.

73. The system of claim 49, wherein the treatment facility is arranged to treat the pressurized liquid to at least partially remove said at least one extraneous component therefrom, thereby preparing it for said further disposition, and said treatment facility is arranged to conduct at least one treatment selected from the group consisting of: scrubbing; liquid/liquid extraction; in situ chemical reaction removal; affinity medium contacting using an affinity medium having an affinity for said at least one extraneous component; actinic radiation exposure; desolubilization of said at least one extraneous component soluble in the SCF when in the supercritical state but insoluble in the non-supercritical pressurized liquid.

74. The system of claim 49, wherein the treatment facility comprises a scrubber arranged to scrub the pressurized liquid.

75. The system of claim 49, wherein the treatment facility comprises liquid/liquid extraction apparatus.

76. The system of claim 49, wherein the treatment facility comprises an in situ chemical reaction vessel for in situ chemical reaction of the pressurized liquid.

77. The system of claim 49, wherein the treatment facility comprises an affinity medium contacting vessel containing an affinity medium having an affinity for said at least one extraneous component.

78. The system of claim 49, wherein the treatment facility comprises an actinic radiation source arranged to irradiate the pressurized liquid.

79. The system of claim 49, wherein the treatment facility comprises a separation chamber arranged for desolubilization of said at least one extraneous component, which is soluble in the SCF when in the supercritical state but insoluble in the non-supercritical pressurized liquid.

80. The system of claim 49, further comprising a processing unit arranged to convert the treated pressurized liquid from the treatment facility to a supercritical state, to thereby regenerate said supercritical fluid composition.

81. The system of claim 80, wherein the processing unit is arranged to change at least one of temperature and pressure of the pressurized liquid, wherein the processing unit is arranged to heat the pressurized liquid.

82. The system of claim 80, wherein the processing unit is arranged to change pressure of the pressurized liquid.

83. The system of claim 80, wherein regenerated supercritical fluid composition is recycled to said SCF-using process facility.

84. The system of claim 49, wherein the treatment facility is arranged to at least partially remove contaminants deriving from utilizing said supercritical fluid (SCF) composition in said SCF-using process facility.

85. The system of claim 84, further comprising a processing unit arranged to convert the treated pressurized liquid from the treatment facility to a supercritical state, to thereby regenerate said supercritical fluid composition.

86. The system of claim 85, wherein regenerated supercritical fluid composition is recycled to said SCF-using process facility.

87. The system of claim 49, wherein said further disposition comprises gasification of the pressurized liquid to yield a gas comprising a supercritical fluid component of said supercritical fluid composition, in gaseous form, and said system further comprises gasification componentry.

88. The system of claim 87, wherein the gasification componentry comprises a cyclone.

89. The system of claim 88, wherein the cyclone contains a contacting medium effective for removal of residual extraneous component(s) from said gas.

90. The system of claim 49, wherein the treatment facility comprises a water stripping unit arranged to water strip extraneous component from the pressurized liquid.

91. The system of claim 90, wherein said water stripping unit comprises a separation column packed with contacting medium.

92. The system of claim 91, wherein said contacting medium comprises a medium selected from the group consisting of metal mesh elements and glass beads.

93. The system of claim 49, wherein said treatment facility is arranged to gasify the pressurized liquid and to discharge to the atmosphere a supercritical fluid component of the supercritical fluid composition, wherein said supercritical fluid component is in a gasified form.

94. The system of claim 93, wherein the supercritical fluid component comprises $CO_2$.

\* \* \* \* \*